(Model.)
R. C. SMITH.
ATTACHMENT FOR CALCULATING SCALES.
No. 357,346. Patented Feb. 8, 1887.
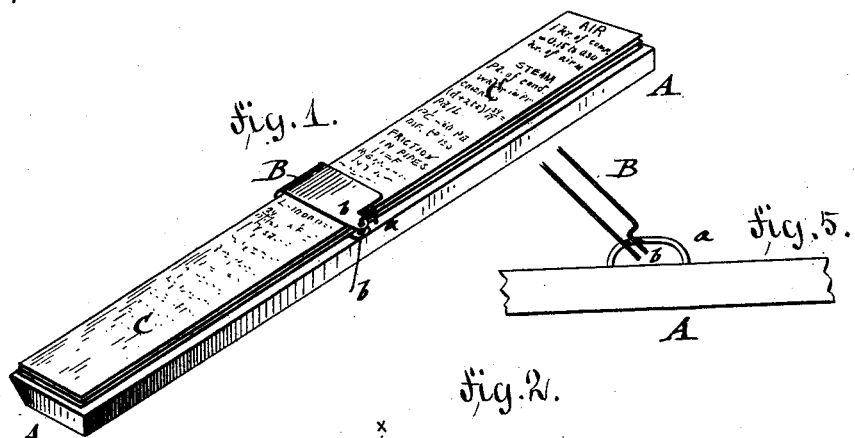
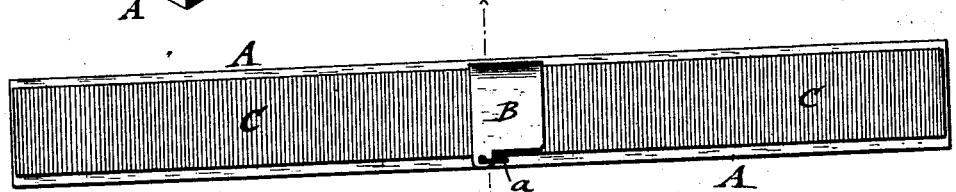
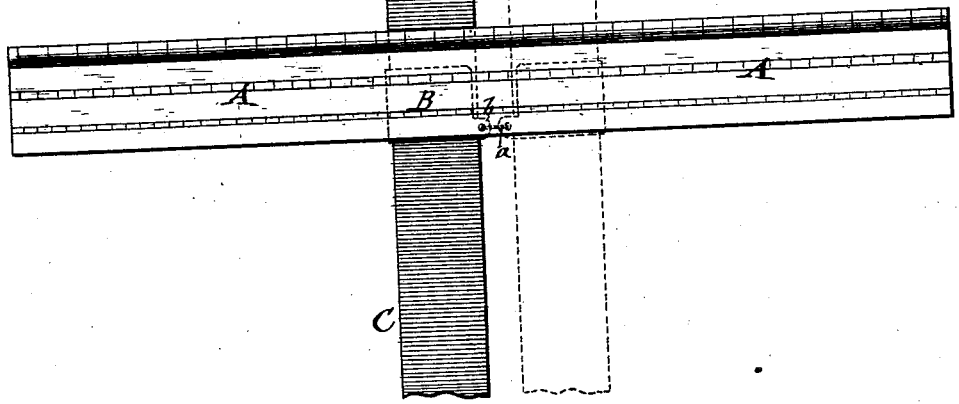
WITNESSES:
INVENTOR
Rudolph C. Smith
BY
ATTORNEYS.

UNITED STATES PATENT OFFICE.

RUDOLPH C. SMITH, OF YONKERS, NEW YORK.

ATTACHMENT FOR CALCULATING-SCALES.

SPECIFICATION forming part of Letters Patent No. 357,346, dated February 8, 1887.

Application filed May 5, 1886. Serial No. 201,200. (Model.)

*To all whom it may concern:*

Be it known that I, RUDOLPH C. SMITH, of Yonkers, in the county of Westchester and State of New York, have invented certain new and useful Improvements in Attachments for Calculating-Scales, of which the following is a specification.

This invention has reference to an improved attachment for calculating-scales, by which a number of formula-strips are retained at the under side of the scale in longitudinal direction, so as to be conveniently carried in the pocket, or quickly set at right angles, or at any other angle thereto, so as to facilitate the use of each individual strip in connection with the scale for purposes of computation, the formulæ being read from the strips in the same manner as they are now read from the book or table. For example, when a calculation is to be made of the weight of cast-iron, the strips are swung at right angles to the scale and the calculation made on the scale according to the formulæ made on the strip. If the number of bricks in a wall are to be calculated, the strips are so adjusted that the formula is in view, and then the calculation is made on the scale according to the formulæ given. The formulæ are thus close to the scale and the eye need not travel a great distance from one to the other. Considerable time is lost in reading the formulæ from a hand-book and then making the calculations. Besides, the strips can be folded and occupy much less space than a hand-book would. The formulæ are printed transversely on the strips, so that the formulæ on the strips will be parallel with the scale. While using said strips the strips are swung into a position at right angles to the scale, as set forth, thereby facilitating the reading of the formulæ.

The invention consists of the combination, with a calculating-scale, of a sleeve-shaped spring-clasp that is connected by a joint with the scale, said sleeve supporting the formula-strips that are used in connection with the scale.

In the accompanying drawings, Figure 1 represents a perspective view of a calculating-scale with my improved attachment. showing the scale bottom upward. Fig. 2 is a bottom view of the scale and attachment. Fig. 3 is a top view of the scale, showing the formula-strips in position for use. Fig. 4 is a vertical transverse section on line *x x*, Fig. 2; and Fig. 5 is a detail side view of the joint between the scale and sleeve.

Similar letters of reference indicate corresponding parts.

In the drawings, A represents a calculating-scale, preferably a logarithmic scale, of any approved construction. To the under side of the scale is applied a staple, *a*, to which is connected by perforated ears *b b* a sleeve-shaped clasp, B, of sheet metal, which binds by spring action upon a number of formula-strips, C, that are made of card-board, wood, metal, or other material and printed at both sides with formulæ and instructions for the use of the strips in connection with the calculating-scale. The staple and perforated ears form a joint by which the formula-strips may be adjusted either longitudinally in line with the bottom of the scale, or at right angles or other angle to the same when the scale is to be used for calculating purposes. When the other side of any of the strips is to be used, the sleeve B is turned on the staple, so as to reverse the strips and expose the other side of the same to view, as shown in Fig. 3.

When one of the lower strips C is to be used, the upper strips may be moved in longitudinal direction in the sleeve until they clear the strip that is desired to be used, or they may be spread apart, like the leaves of a fan, so as to exhibit the greater part of the lower strips.

In place of the joint shown, analogous constructions of joints may be used, as the special construction is immaterial, provided that it permits the change of position of the formula-strips from their position in line with the scale to a position at an angle thereto, and also the strips can be reversed. The sleeve is preferably made of sheet metal in such a manner that a spring-pressure is exerted on the strips, so that they are prevented from shifting in the sleeve. The formula-strips are thereby conveniently carried with the scale and always ready for use whenever required, and form a convenient and effective attachment or auxiliary to the calculating-scale.

Having thus described my invention, I claim as new and desire to secure by Letters Patent—

1. The combination of a scale, a sleeve-shaped spring-clasp jointed to said scale, and formula-strips supported by said clasp, substantially as set forth.

2. The combination, with a calculating-scale, of a sleeve-shaped clasp, a joint connecting the scale and sleeve, and formula strips supported in said clasp, said formula-strips being adapted to be placed in line with the scale, or at any angle thereto, substantially as set forth.

3. The combination of a calculating-scale having a fixed staple, a spring sleeve or clasp connected by perforated ears with said staple, and formula-strips supported in said sleeve or clasp, substantially as set forth.

In testimony that I claim the foregoing as my invention I have signed my name in presence of two subscribing witnesses.

RUDOLPH C. SMITH.

Witnesses:
  PAUL GOEPEL,
  MARTIN PETRY.